(12) United States Patent
Liu

(10) Patent No.: US 11,060,199 B2
(45) Date of Patent: Jul. 13, 2021

(54) ELECTRODE CONFIGURATIONS FOR ELECTROLYTIC CELLS AND RELATED METHODS

(71) Applicant: ELYSIS LIMITED PARTNERSHIP, Montreal (CA)

(72) Inventor: Xinghua Liu, Murrysville, PA (US)

(73) Assignee: ELYSIS LIMITED PARTNERSHIP, Montreal (CA)

( * ) Notice: Subject to any disclaimer, the term of this patent is extended or adjusted under 35 U.S.C. 154(b) by 0 days.

(21) Appl. No.: 16/571,718

(22) Filed: Sep. 16, 2019

(65) Prior Publication Data
US 2020/0010967 A1 Jan. 9, 2020

Related U.S. Application Data

(63) Continuation of application No. 15/469,318, filed on Mar. 24, 2017, now Pat. No. 10,415,147.
(Continued)

(51) Int. Cl.
*C25C 3/08* (2006.01)
*C25C 7/06* (2006.01)
(Continued)

(52) U.S. Cl.
CPC .................. *C25C 3/08* (2013.01); *C25C 3/10* (2013.01); *C25C 3/12* (2013.01); *C25C 7/007* (2013.01); *C25C 7/06* (2013.01)

(58) Field of Classification Search
None
See application file for complete search history.

(56) References Cited

U.S. PATENT DOCUMENTS 3,404,082 A * 10/1968 Henkie ..................... C25C 3/10
                                                  204/247.4
3,909,375 A   9/1975 Holliday et al.
(Continued)

FOREIGN PATENT DOCUMENTS

WO       199209724 A1    6/1992
WO       2001/77414 A2   10/2001

OTHER PUBLICATIONS

*Zimmer Technology, Inc. & Zimmer, Inc. v. Howmedica Osteonics Corporation*, US District Court, N.D. Indiana, South Bend Division, Oct. 2005 (Year: 2005).
(Continued)

*Primary Examiner* — Harry D Wilkins, III
(74) *Attorney, Agent, or Firm* — Damien Calvet; Gowling WLG (Canada) LLP

(57) ABSTRACT

In one embodiment, an electrolytic cell for the production of aluminum from alumina includes: at least one anode module having a plurality of anodes; at least one cathode module, opposing the anode module, wherein the at least one cathode module comprises a plurality of cathodes, wherein the plurality of anodes are suspended above the cathode module and extending downwards towards the cathode module, wherein the plurality of cathodes are positioned extending upwards towards the anode module, wherein each of the plurality of anodes and each of the plurality of cathodes are alternatingly positioned, wherein the plurality of anodes is selectively positionable in a horizontal direction relative to adjacent cathodes, wherein the anode module is selectively positionable in a vertical direction relative to the cathode module, and wherein a portion of each of the anode electrodes overlap a portion of adjacent cathodes.

23 Claims, 12 Drawing Sheets

Related U.S. Application Data

(60) Provisional application No. 62/313,266, filed on Mar. 25, 2016.

(51) Int. Cl.
  *C25C 7/00* (2006.01)
  *C25C 3/10* (2006.01)
  *C25C 3/12* (2006.01)

(56) References Cited

U.S. PATENT DOCUMENTS

| | | | |
|---|---|---|---|
| 4,098,666 A | 7/1978 | Ralston | |
| 4,198,282 A | 4/1980 | Andreassen et al. | |
| 4,269,673 A * | 5/1981 | Clark | C25C 3/10 205/374 |
| 4,392,925 A | 7/1983 | Alder et al. | |
| 4,405,433 A | 9/1983 | Payne | |
| 4,622,111 A | 11/1986 | Brown et al. | |
| 4,664,760 A | 5/1987 | Jarrett | |
| 4,720,333 A * | 1/1988 | Duval | C25C 3/10 204/241 |
| 4,865,701 A | 9/1989 | Beck et al. | |
| 5,279,715 A | 1/1994 | La Camera | |
| 5,290,313 A | 3/1994 | Heldreth | |
| 5,368,702 A | 11/1994 | De Nora | |
| 5,725,744 A | 3/1998 | De Nora et al. | |
| 5,865,981 A | 2/1999 | De Nora | |
| 5,938,914 A | 8/1999 | Dawless et al. | |
| 6,187,168 B1 | 2/2001 | Lacamera et al. | |
| 6,419,812 B1 | 7/2002 | Beck et al. | |
| 6,419,813 B1 | 7/2002 | Brown et al. | |
| 6,558,525 B1 | 5/2003 | Bradford et al. | |
| 6,797,148 B2 | 9/2004 | De Nora | |
| 7,014,740 B2 | 3/2006 | Kim | |
| 7,959,772 B2 | 6/2011 | De Nora | |
| 10,415,147 B2 * | 9/2019 | Liu | C25C 7/007 |
| 2003/0057102 A1 | 3/2003 | Beck | |
| 2003/0173227 A1 | 9/2003 | Barnett et al. | |
| 2004/0011661 A1 | 1/2004 | Bradford et al. | |
| 2004/0163967 A1 | 8/2004 | Lacamera et al. | |
| 2006/0054499 A1 | 3/2006 | De Nora | |
| 2007/0278107 A1 | 12/2007 | Barnett et al. | |
| 2016/0230297 A1 | 8/2016 | Deyoung et al. | |
| 2017/0283968 A1 | 10/2017 | Mosser et al. | |

OTHER PUBLICATIONS

Supplementary European Search Report for corresponding EP application No. 17771281 dated Nov. 26, 2019.

Search report dated Feb. 1, 2021 from the Eurasian patent office, with English translation.

* cited by examiner

ELECTRODE CONFIGURATIONS FOR ELECTROLYTIC CELLS AND RELATED METHODS

CROSS-REFERENCE TO RELATED APPLICATIONS

This application is a continuation of U.S. non-provisional patent application Ser. No. 15/469,318 filed on Mar. 24, 2017, which claims priority to U.S. provisional patent application Ser. No. 62/313,266, filed Mar. 25, 2016, both of which being entirely hereby incorporated by reference.

FIELD

The present invention relates to apparatus and methods for producing aluminum metal and more particularly, to apparatus and methods for producing aluminum metal by the electrolysis of alumina.

BACKGROUND

Hall-Heroult electrolytic cells are utilized to produce aluminum metal in commercial production of aluminum from alumina that is dissolved in molten electrolyte (a cryolite "bath") and reduced by a DC electric current using a consumable carbon anode. Traditional methods and apparatus for smelting alumina utilize carbon anodes that are consumed slowly and generate CO2, a "greenhouse gas." Traditional anode shapes and sizes also limit electrolysis of the reactant (dissolved alumina), which travels to the middle of the anode bottom for reaction. This leads to a phenomenon called, "anode affect" that results in the generation of $CF_4$, another regulated "greenhouse" gas. Besides the traditional commercial aluminum smelter, the prior art also includes aluminum smelter designs where the anodes and cathodes have a vertical orientation, e.g., as described in U.S. Pat. No. 5,938,914 to Dawless, entitled, Molten Salt Bath Circulation Design For An Electrolytic Cell, which is incorporated by reference herein in its entirety. Notwithstanding, alternative electrode and aluminum smelter designs remain of interest in the field.

SUMMARY

Generally, the various embodiments of the present disclosure are directed towards vertical electrode configurations for electrolytically producing non-ferrous metal (e.g. aluminum) in an electrolysis cell. As described herein, anode modules (e.g. each module configured with a plurality of vertically oriented, inert anodes) is configured (e.g. attached) to a longitudinal beam, where the beam is configured to span across the open, upper end of the electrolysis cell. The longitudinal beam is configured to be attached to or otherwise coupled to components/lift mechanisms to adjust (e.g. raise or lower) the beam, and thus, raise or lower the corresponding anode modules that are coupled to the beam. With the cathode modules positioned along (and attached to) the cell bottom, the vertical adjustment of the beams has a corresponding adjustment of the anode-cathode overlap (i.e. raised beam raises the anode modules and decreases the ACO, lowered beam lowers the anode modules and increases the ACO). Also, in some embodiments, the individual anode modules are configured to be adjustable in their general horizontal position along the longitudinal beam spanning the cell. As such, the anode module is designed/configured to be loosened in its coupling attachment to the module and enabled to move the module along the beam. Thus, the anodes are shifted to modify the anode-cathode distance between a group of anodes in the adjusted module and the corresponding group of cathodes in the cathode module. In some embodiments, the anode to cathode distance is adjusted during preheating or electrolytic production of metal (e.g. to promote a generally uniform anode-to-cathode distance). In some embodiments, the anode-cathode distance (ACD) is adjusted during metal production. In some embodiment, the anode-cathode overlap (ACO) is adjusted during metal production. In some embodiments, the anode-cathode distance (ACD) and ACO are adjusted during metal production.

The disclosed subject matter relates to an electrolytic cell for the production of aluminum from alumina that has: at least one anode module having a plurality of anodes, wherein each of the plurality of anodes is an oxygen-involving electrode; at least one cathode module, opposing the anode module, wherein the at least one cathode module comprises a plurality of cathodes, wherein the each of the plurality of anodes and each of the plurality of cathodes have surfaces thereon that are vertically oriented and spaced one from another, wherein the cathodes are wettable, and wherein the at least one cathode module is coupled to a bottom of the electrolytic cell; a cell reservoir; an electrolyte disposed within the cell reservoir; and a metal pad disposed within the cell reservoir, wherein the plurality of anodes are at least partially immersed in the electrolyte and suspended above the cathode module and extending downwards towards the cathode module, wherein the plurality of cathodes are completely immersed in the electrolyte, wherein the plurality of cathodes are positioned in the cell reservoir extending upwards towards the anode module, wherein each of the plurality of anodes and each of the plurality of cathodes are alternatingly positioned within the cell reservoir, wherein the plurality of anodes is selectively positionable in a horizontal direction relative to adjacent cathodes, wherein the anode module is selectively positionable in a vertical direction relative to the cathode module, and wherein a portion of each of the anode electrodes overlap a portion of adjacent cathodes.

In another embodiment, the plurality of anodes form an least one row on the anode module.

In another embodiment, the plurality of cathodes form an at least one row on a cathode module.

In another embodiment, adjacent anodes in the at least one row of anodes have a gap therebetween.

In another embodiment, adjacent cathodes in the at least one row of cathodes have a gap therebetween.

In another embodiment, a horizontal distance between the anode and the cathode is in a range of ¼" to 6".

In another embodiment, a vertical overlap of the anode and the cathode is in the range of 1" to 100".

In another embodiment, the anode is a plate with a rectangular cross-sectional shape that is 1" to 75" in width, 5" to 100" in height and ¼" to 10" in thickness.

In another embodiment, the anode is a plate with a rectangular cross-sectional shape with radiused corners having a width in the range of 1" to 75" in width, 5" to 100" in height and ¼" to 10" in thickness and a corner radius of ⅛" to 1".

In another embodiment, the anode is a plate with a rounded rectangular cross-sectional shape with radiused ends having a width in the range of 1" to 75" in width, 5" to 100" in height and ¼" to 10" in thickness and an end radius of ⅛" to 3".

In another embodiment, the anode has an elliptical cross-sectional shape with a major axis in the range of 1" to 30", a minor axis in the range of ¼" to 5" and a height in the range of 5" to 50".

In another embodiment, the anode has a circular cross-sectional shape with a radius in the range of ¼" to 6" and a height in the range of 5" to 75".

In another embodiment, the cathode is a plate with a rectangular cross-sectional shape having a width in the range of 1" to 75" in width, 5" to 100" in height and ⅛" to 5" in thickness.

In another embodiment, the cathode module includes a plurality of cathodes forming at least one row on the cathode module with adjacent cathodes in a row having a gap therebetween and wherein the plurality of cathodes have a rectangular cross-sectional shape having a dimensions in the range of 1" to 40" in width, 5" to 75" in height and ⅛" to 5" in thickness and a gap in the range of 1/16" to 5" therebetween.

In another embodiment, the cathode module includes a plurality of cathodes forming at least one row on a cathode module with adjacent cathodes in a row having a gap therebetween and wherein the plurality of cathodes have a circular cross-sectional shape having a radius in the range of ⅛" to 3", a height in the range of 5" to 75" and a gap in the range of 1/16" to 2" therebetween.

In another embodiment, the at least one cathode includes a plurality of cathodes forming at least one row on a cathode module with adjacent cathodes in a row having a gap therebetween and wherein the plurality of cathodes have a rounded rectangular cross-sectional shape having dimensions in the range of ¼" to 3" in width, 5" to 75" in height and ⅛" to 3" in thickness and a gap in the range of 1/16" to 3" therebetween.

In another embodiment, the cathode module includes a plurality of cathodes forming at least one row on a cathode module with adjacent cathodes in a row having a gap therebetween and wherein the plurality of cathodes have an elliptical cross-sectional shape having a minor axis in the range of ¼" to 3" a major axis in the range of 1" to 8" and a height in the range of 5" to 75" and a gap in the range of 1/16" to 3" therebetween.

In another embodiment, the anode module includes a plurality of anodes disposed on the anode module in an array forming a plurality of rows and the cathode module includes a plurality of cathodes disposed on the cathode module in an array forming a plurality of rows, wherein the plurality of rows of anodes and the plurality of rows of cathodes are interleaving, and wherein the plurality of anodes have a cross-sectional shape of at least one of rectangular, rectangular with radiused edges, rounded rectangular, circular, or elliptical, and the plurality of cathodes have a cross-sectional shape of at least one of rectangular, rectangular with radiused edges, rounded rectangular, circular, or elliptical.

In another embodiment, the anode module has a profile in a plane perpendicular to a direction of extension of the anodes with a first dimension larger than a second dimension, the plurality of rows of anodes are disposed either parallel or perpendicular to the first dimension.

In another embodiment, a vertical distance between an upper surface of the electrolyte and an upper end of the cathode is in a range of ⅛" to 10".

In another embodiment, a positioning apparatus is coupled to the at least one anode module, wherein the positioning apparatus is configured to selectively position the at least one anode module in a vertical direction relative to the cathode module, and wherein the positioning apparatus is configured to selectively position the plurality of anodes in a horizontal direction relative to adjacent cathodes.

In another embodiment, a method for producing aluminum metal by the electrochemical reduction of alumina, comprises: passing current between an anode and a cathode through an electrolytic bath of an electrolytic cell, the cell comprising: (a) passing current between an anode and a cathode through an electrolytic bath of an electrolytic cell, the cell comprising: (i) at least one anode module having a plurality of anodes, wherein each of the plurality of anodes is an oxygen-involving electrode, (ii) at least one cathode module, opposing the anode module, wherein the at least one cathode module comprises a plurality of cathodes, wherein each of the plurality of anodes and each of the plurality of cathodes have surfaces thereon that are vertically oriented and spaced one from another, wherein the cathodes are wettable, and wherein the at least one cathode module is coupled to a bottom of the electrolytic cell, (iii) a cell reservoir, (iv) an electrolyte disposed within the cell reservoir, and (v) a metal pad disposed within the cell reservoir, wherein the plurality of anodes are at least partially immersed in the electrolyte and suspended above the cathode module and extending downwards towards the cathode module, wherein the plurality of cathodes are completely immersed in the electrolyte, wherein the plurality of cathodes are positioned in the reservoir extending upwards towards the anode module, wherein each of the plurality of anodes and each of the plurality of cathodes are alternatingly positioned within the cell reservoir, wherein the plurality of anodes is selectively positionable in a horizontal direction relative to adjacent cathodes, wherein the anode module is selectively positionable in a vertical direction relative to the cathode module, and wherein a portion of each of the anode electrodes overlap a portion of adjacent cathodes; (b) feeding a feed material into the electrolytic cell; and (c) adjusting the anode module in a vertical direction relative to the cathode module.

In another embodiment, the feed material is electrolytically reduced into a metal product.

In another embodiment, the metal product is drained from the cathodes to the cell bottom to form a metal pad.

In another embodiment, a metal product is produced having a purity of P1 020.

In another embodiment, adjusting the anode module comprises raising the at least one anode module to decrease an overlap of the portion of each of the anode electrodes relative to the portion of adjacent cathodes.

In another embodiment, adjusting the anode module comprises lowering the at least one anode module to increase an overlap of the portion of each of the anode electrodes relative to the portion of adjacent cathodes.

In another embodiment, a method for producing aluminum metal by the electrochemical reduction of alumina, comprises: (a) passing current between an anode and a cathode through an electrolytic bath of an electrolytic cell, the cell comprising: (i) at least one anode module having a plurality of anodes, wherein each of the plurality of anodes is an oxygen-involving anode, (ii) at least one cathode module, opposing the anode module, wherein the at least one cathode module comprises a plurality of cathodes, wherein each of the plurality of anodes and each of the plurality of cathodes have surfaces thereon that are vertically oriented and spaced one from another, wherein the cathodes are wettable, and wherein the at least one cathode module is coupled to a bottom of the electrolytic cell, (iii) a cell reservoir, (iv) an electrolyte disposed within the cell reservoir, and (v) a metal pad disposed within the cell reservoir, wherein the plurality of anodes are at least partially immersed in the electrolyte and suspended above the cathode module and extending downwards towards the cathode module, wherein the plurality of cathodes are completely immersed in the electrolyte, wherein the plurality of cathodes are positioned in the cell reservoir extending upwards towards the anode module, wherein each of the plurality of anodes and each of the plurality of cathodes are alternatingly positioned within the cell reservoir, wherein the plurality of anodes is selectively positionable in a horizontal direction relative to adjacent cathodes, wherein the anode module is selectively positionable in a vertical direction relative to the cathode module, and wherein a portion of each of the anode electrodes overlap a portion of adjacent cathodes; (b) feeding a feed material into the electrolytic cell; and (c) adjusting the plurality of anodes in a horizontal direction relative to adjacent cathodes.

In another embodiment, adjusting the plurality of anodes comprises adjusting the plurality of anodes in a horizontal direction such that a horizontal spacing is substantially similar on either side of the anodes in the anode module.

In another embodiment, the feed material is electrolytically reduced into a metal product.

In another embodiment, the metal product is drained from the cathodes to the cell bottom to form a metal pad.

In another embodiment, a metal product is produced having a purity of Pl 020.

BRIEF DESCRIPTION OF THE DRAWINGS

For a more complete understanding of the present disclosure, reference is made to the following detailed description of exemplary embodiments considered in conjunction with the accompanying drawings.

DETAILED DESCRIPTION OF EXEMPLARY EMBODIMENTS

Figure 1:
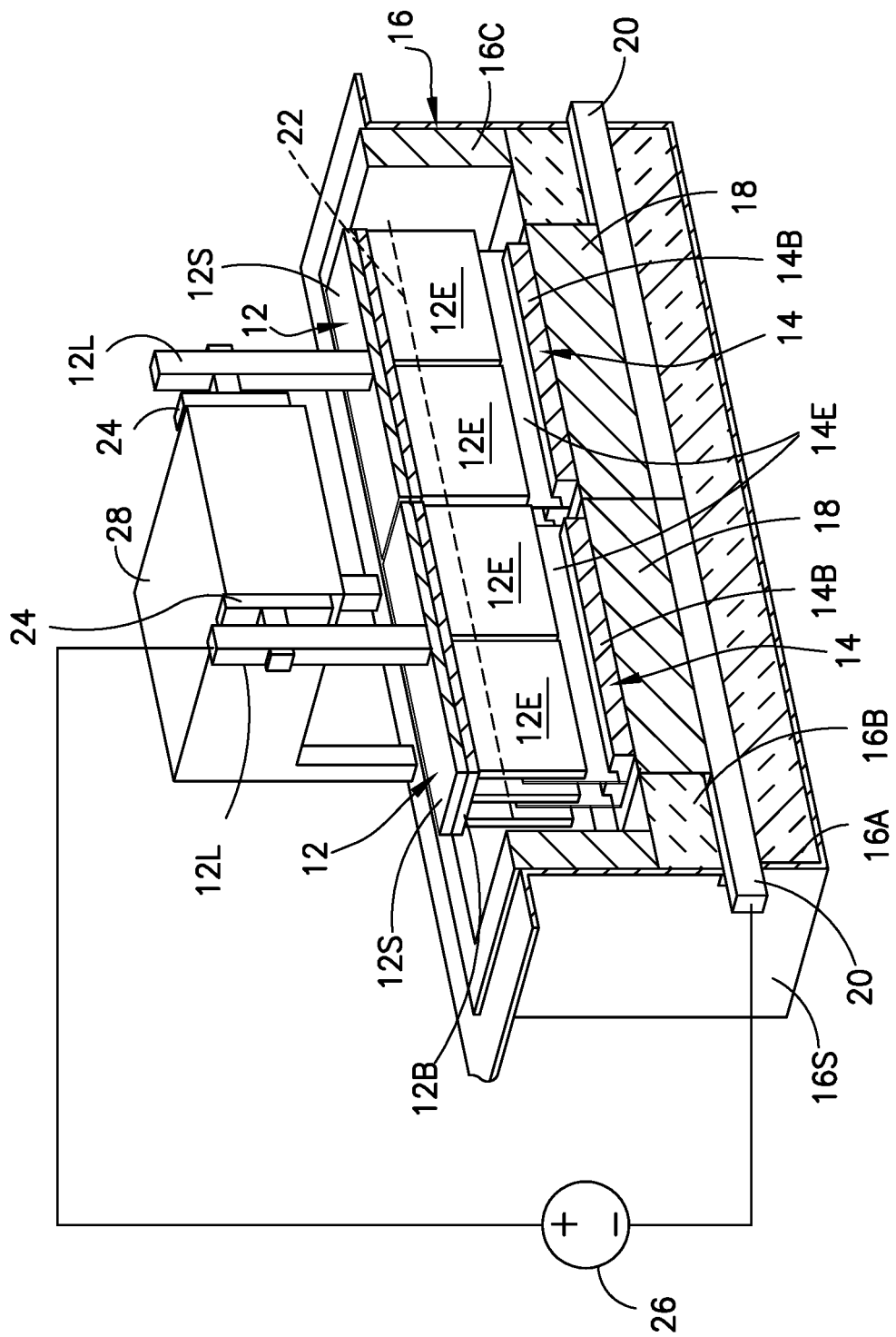
FIG. 1 is a partially schematic cross-sectional view of an electrolytic cell m accordance with an embodiment of the present disclosure.

FIG. 1 shows a schematic cross-section of an electrolytic cell 10 for producing aluminum metal by the electrochemical reduction of alumina using an anode and a cathode. In some embodiments, the anode is an inert anode. Some non-limiting examples of inert anode compositions include: ceramic, metallic, cermet, and/or combinations thereof. Some non-limiting examples of inert anode compositions are provided in U.S. Pat. Nos. 4,374,050, 4,374,761, 4,399, 008, 4,455,21 L 4,582,585, 4,584,172, 4,620,905, 5,279, 715, 5,794,112 and 5,865,980, assigned to the assignee of the present application. In some embodiments, the anode is an oxygen-involving electrode. An oxygen-involving electrode is an electrode that produces oxygen during electrolysis. In some embodiments, the cathode is a vettable cathode. In some embodiments, aluminum '←Vettable materials are materials having a contact angle with molten aluminum of not greater Umn 90 degrees in the molwn electrolyte. Some non-limiting examples of wettable materials may comprise one or more of Tilh Zrlh, 1-lffh, Srlh, carbonaceous materials, and combinations thereof.

The cell 10 has at least one anode module 12. In some embodiments, the anode module 12 has at least one of anode 12E, or a plurality of anodes 12E, suspended above at least one cathode module 14 having at least one cathode 14E, or a plurality of cathodes 14E. The plurality of cathodes 14E is positioned in the cell reservoir 16. The plurality of cathodes 14E extend upwards towards the anode module 12. While a plurality of anodes 12E and cathodes 14E of a specific number are shown in the various embodiments of the present disclosure, any number of anodes 12E and cathodes 14E greater than or equal to 1 may be used to define an anode module 12 or a cathode module 14, respectively. In some embodiments, the cathode module 14 is fixedly coupled to the bottom of the cell 10. In some embodiments, the cathodes 14E are supported in a cathode support 14B, which rests in a cell reservoir 16 on cathode blocks 18, e.g., made from carbonaceous material in electrical continuity with one or more cathode current collector bars 20. In some embodiments, the cathode blocks 18 are fixedly coupled to the bottom of the cell 10. The reservoir 16 typically has a steel shell 16S and is lined with insulating material 16A, refractory material 16B and sidewall material 16C. The reservoir 16 is capable of retaining a bath of molten electrolyte (shown diagrammatically by dashed line 22) and a molten aluminum metal pad therein. Portions of an anode bus 24 that supplies electrical current to the anode modules 12 are shown pressed into electrical contact with anode rods 12L of the anode modules 12. The anode rods 12L are structurally and electrically connected to an anode distribution plate 12S, to which a thermal insulation layer 12B is attached. The anodes 12E extend through the thermal insulation layer 12B and mechanically and electrically contact the anode distribution plate 12S. The anode bus 24 would conduct direct electrical current from a suitable source 26 through the anode rods 12L, the anode distribution plate 12S, anode elements, electrolyte 22 to the cathodes 14E and from there through the cathode support 14B, cathode blocks 18 and cathode current collector bars 20 to the other pole of the source of electricity 26. The anodes 12E of each anode module 12 are in electrical continuity. Similarly, the cathodes 14E of each cathode module 14 are in electrical continuity. The anode modules 12 may be raised and lowered by a positioning apparatus to adjust their position relative to the cathode modules 14 to adjust the anode-cathode overlap (ACO). An exemplary positioning apparatus is depicted in FIG. 14 and FIG. 15.

Figure 14:
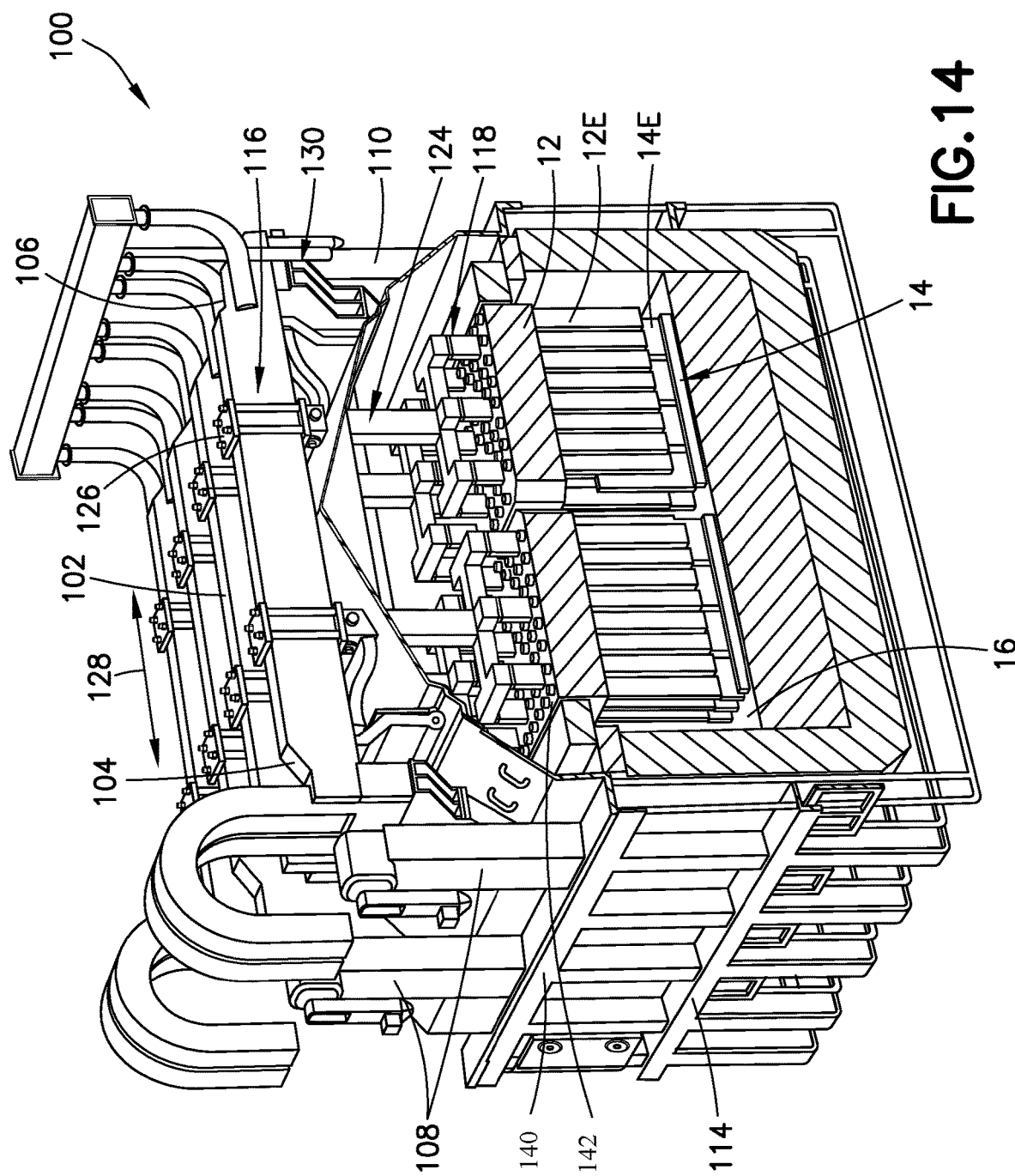
FIG. 14 is a partially cross-sectional, perspective view of an exemplary positioning apparatus coupled to an electrolytic cell for the production of aluminum.
Figure 15:
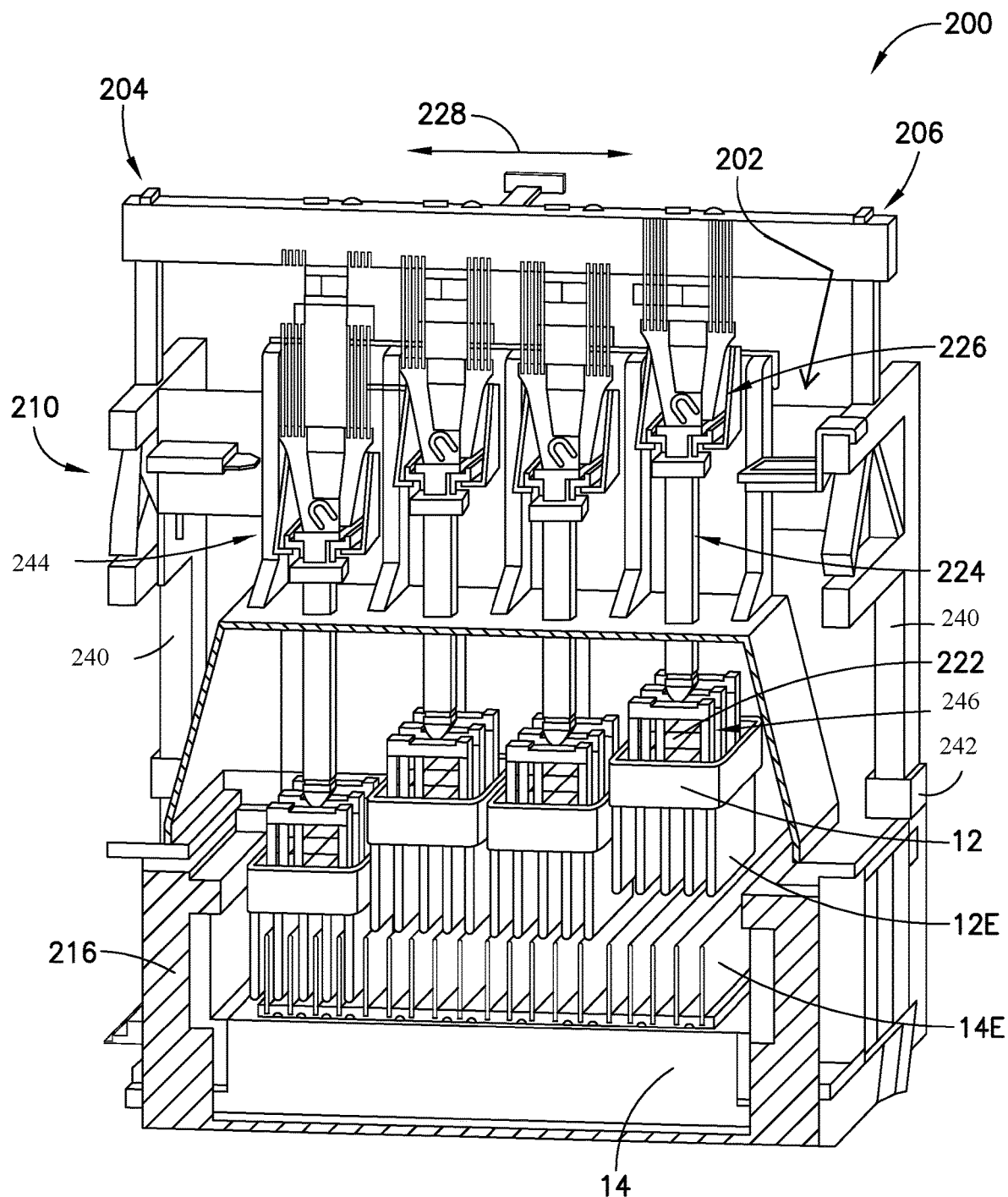
FIG. 15 is a partially cross-sectional, perspective view of an exemplary positioning apparatus coupled to an electrolytic cell for the production of aluminum.

FIG. 14 depicts a perspective view of an exemplary apparatus 100 for the production of aluminum. In some embodiments, the at least one anode module 12 having a plurality of anodes 12E is supported above the corresponding at least one cathode module 14 having a plurality of cathodes 14E. In some embodiments, the at least one anode module 12 is supported by a positioning apparatus as depicted in FIG. 14. In some embodiments, the positioning apparatus comprises at least one span beam 102. While the exemplary apparatus 100 depicted in FIG. 14, uses four span beams 102, any number of span beams greater than or equal to 1 may be used in accordance with the number of anode modules 12 and cathode modules 12 in the electrolytic cell.

The span beam 102 has a first end 104 and an opposing second end 106. In some embodiments, the span beam 102 is supported by a first supporting apparatus 108 at the first end 104 and by a second supporting apparatus 110 at the second end 106. Each of the supporting apparatuses 108, 110 are positioned on a deck 140 of the sidewall 142. The span beam 102 is oriented perpendicular to the sidewall 142. In some embodiments, the supporting apparatuses 108, 110 are coupled to the deck 140. In some embodiments, the span beam 102 can be raised or lowered by lifts 130 coupled to the supporting apparatuses 108, 110.

The anode module 12 is coupled to the span beam 102 via a connector apparatus 116. The connector apparatus 116 comprises a first portion 118 in contact with and connected to a surface 120 of the anode module 12. In some embodiments, the first portion 118 is connected to the surface 120 at a plurality of connection points. The connector apparatus 116 further comprises a second portion 124. The second portion 124 has a first end and an opposing second end. The first end of the second portion 124 is coupled to, or integrally formed with, the first portion 118. The second portion 124 extends vertically from the first portion 124 toward the span beam 102. The connector apparatus 116 further comprises a third portion 126. The third portion 126 is coupled to the second end of the second portion 124. In some embodiments, the third portion 126 is clamped to the span beam 102. In some embodiments, the third portion can be unclamped and allowed to move freely along the length of the span beam 102 (i.e. in the direction shown by arrow 128) to allow for selective positioning of the plurality of anodes in a horizontal direction relative to adjacent cathodes.

FIG. 15 depicts a perspective view of another exemplary apparatus 200 for the production of aluminum. In some embodiments, the at least one anode module 12 having a plurality of anodes 12E is supported above the corresponding at least one cathode module 14 having a plurality of cathodes 14E. In some embodiments, the at least one anode module 12 is supported by a positioning apparatus as depicted in FIG. 15. In some embodiments, the positioning apparatus comprises at least one bridge 202.

The bridge 202 has a first end 204 and an opposing second end 206. In some embodiments, the bridge 202 is supported by a supporting apparatus 210 at the first end 204 and at the second end 206. The supporting apparatus 210 comprises a plurality of vertical supports 240, positioned on opposing decks 242 of the endwall 216. The bridge 202 is oriented perpendicular to the endwall 216 and parallel to the sidewalls. In some embodiments, each vertical support 240 is coupled to each corresponding deck 242. During operation of the exemplary apparatus 200 for the production of aluminum, the exemplary apparatus can be heated to a temperature sufficient to result in expansion of the apparatus. In some embodiments, the vertical supports at one deck 242 are unlocked (i.e. free floating), thereby allowing the deck 242 of the apparatus 200 to expand without deforming any portion of the apparatus 200.

The anode module 12 is coupled to the bridge 202 via a connector apparatus 244.

The connector apparatus 244 comprises a first portion 246 in contact with and connected to a surface 222 of the anode module 12. In some embodiments, the first portion 246 is connected to the surface 222 at a plurality of connection points. The connector apparatus 244 further comprises a second portion 224. The second portion 224 has a first end and an opposing second end. The first end of the second portion 224 is coupled to, or integrally formed with, the first portion 246. The second portion 224 extends vertically from the first portion 246 toward the bridge 202. The connector apparatus 244 further comprises a third portion 226. The third portion 226 is coupled to the second end of the second portion 224. In some embodiments, the third portion 226 can be raised or lowered to adjust the anode module in a vertical direction relative to the cathode module.

In some embodiments, the connector apparatus 244 can be adjusted along the length of the bridge 202 (i.e. in the direction shown by arrow 228) to allow for selective positioning of the plurality of anodes in a horizontal direction relative to adjacent cathodes.

Figure 2:
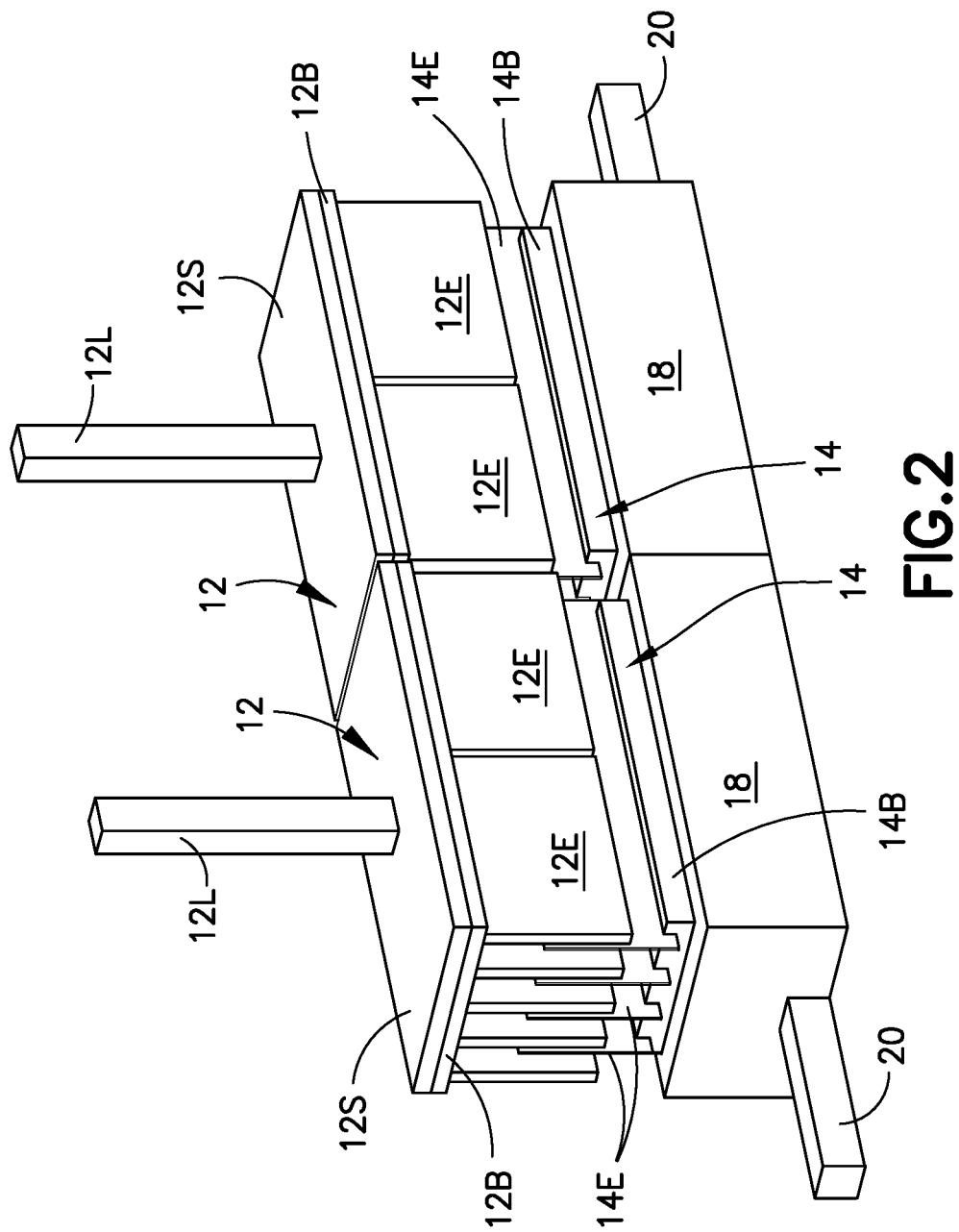
FIG. 2 is a perspective view of a pair of interleaved anode and cathode modules in accordance with an embodiment of the present disclosure.

FIGS. 1 and 2 show two anode modules 12 and two cathode modules 14 with rectangular, plate-shaped anodes 12E and rectangular, plate-shaped cathodes 14E positioned in an interleaved relationship. FIG. 2 shows that the anode modules 12 have an array of anodes 12E with a width of two and a depth of five electrode elements 12E. Each cathode module 14 has an array with a width of one cathode 14E and a depth of four cathodes 14E. As shall be described below, this is one of many configurations contemplated by the present disclosure. This arrangement could also be described as an electrolytic cell having vertical electrode assemblies in which the anode and cathode elements are juxtaposed in alternating parallel configuration to define a plurality of adjacent cells. When electrolyte 22 is added into the reservoir 16, submerging the spaced, interleaved anodes 12E and cathodes 14E, a plurality of electrolytic cells 10 are formed. When alumina ore (not shown) is disbursed in the electrolyte 22 and a direct current is applied through the anode and cathode modules 12, 14 and the electrolyte 22, the alumina may be reduced to aluminum metal by disassociation in solution, reduction at the cathode and oxidation at the anode: $2AhO_3-+4Al$ (at cathode)$+3O_2$ (at anode). As electric current flows through the anode modules 12 and cathode modules 14 of the cell 10, oxygen bearing ions present in the electrolyte are discharged at the surface of the anodes 12E as $O_2$ gas. A cover, ducts and scrubber (not shown) may be provided to capture off gases. Aluminium formed in the cell 10 accumulates on the bottom (i.e. on the metal pad 114F of FIG. 3 within the cell) thereof from which it is periodically tapped.

Figure 3:
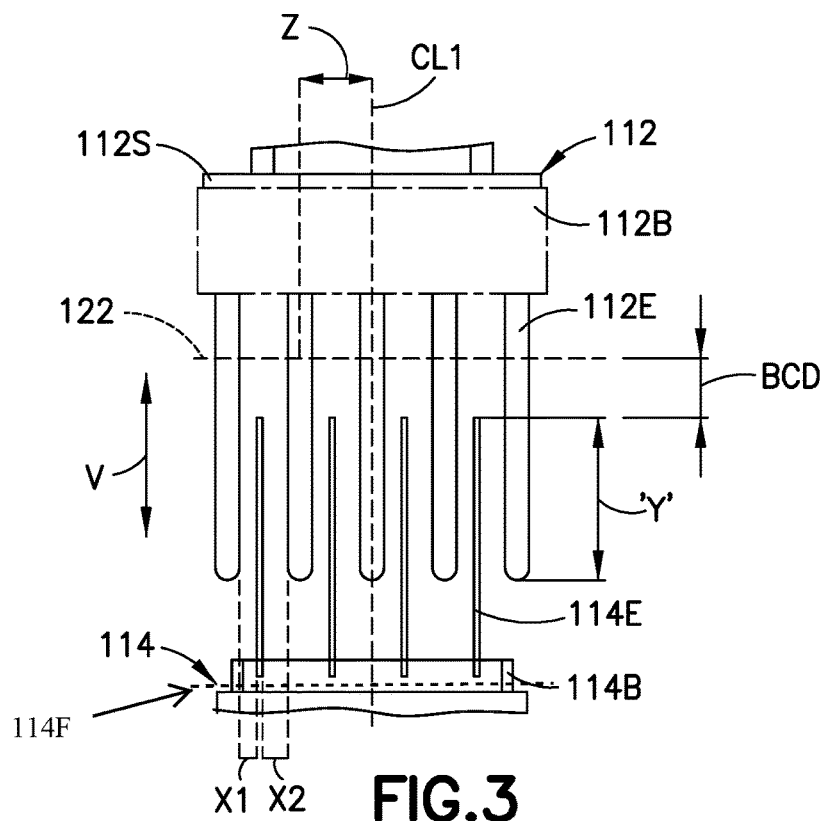
FIG. 3 is a side view of a portion of interleaved anode and cathode modules in accordance with an embodiment of the present disclosure.

FIG. 3 shows an anode module 112 and a cathode module 114 with the electrodes 112E and 114E thereof in an interleaved relationship. The height of the bath 122 relative to the cathodes 114 may be called the "bath-to cathode distance" or BCD. In one embodiment, the BCD may be in the range of ⅛" to 10", and in another embodiment, ½" to 6". The anode module 112 can be raised and lowered (i.e. selectively positionable) in height relative to the position of the cathode module 114, as indicated by double ended arrow V. In some embodiments, the anodes 112E are not completely submerged in the bath and extend across the bath-vapor interface during metal production. This vertical adjustability allows the "overlap" Y of the anodes and the cathodes to be adjusted. The level of the electrolytic bath 22 (FIG. 1), the height of the anodes electrodes 112E and the cathode elements 114E may require the adjustment of the anode module 112 position relative to the cathode module 114 in the vertical direction, to achieve a selected anode-cathode overlap (ACO) Y, as well as depth of submersion in the electrolyte 22. In some embodiments, as shown in FIG. 3, the anode electrodes 112E are at least partially immersed in the electrolyte and the cathode electrodes 114E are completely immersed in the electrolyte. Changing the ACO Y can be used to change the cell resistance and maintain stable cell temperature.

There is also a horizontal spacing, which can be called the anode-cathode distance or "ACD" between the anodes 112E and the cathodes 114E, as indicated by XI, the spacing between a cathode 114E and the anode element 112E to its immediate left and X2, the spacing between a cathode 114E and the anode 112E to its immediate right. As shown in FIG. 3, the spacing Z between the centerlines CL of the anodes 112E and the centerlines (not shown) of the cathodes, may be equal, such that the horizontal spacing, XI, X2 of each cathode 114E from the corresponding anodes 112E will be consistent. As shown in FIG. 3, the spacing XI may be different, e.g., less than the spacing X2, in which case there will be a preferential flow of current associated with the lesser spacing XI or X2. The spacing XI, X2 may be adjustable or fixed, as controlled by the mechanical support structure for the anode modules 112. The position of the cathode modules 114 may also be fixed or adjustable. To provide a desired anode-cathode-distance (ACD), a spacer may be provided that is interposed between at least one opposing anode 112E and cathode element 114E.

The dimensional range of the spacing Z for the combination of anodes 112E and cathodes 114E depends upon the thickness of the anodes 112E and cathodes 114E, as well as the anode-cathode distance (ACD). The dimensional range of the spacing for XI and X2 for the anodes 112E and cathodes 114E having the above described dimensional ranges will be ¼" to 6", in some embodiments, ¼" to 5", in some embodiments ¼" to 3". The dimensional range for the overlap Y, for the anodes 112E and cathodes 114E will be I" to 100", in some embodiments, 4" to 75", in some embodiments, 6" to 35" and in some embodiments 8" to 25".

The anodes 112E may be monolithic or composite, having an internal portion made from a metallic conductor and an outer portion that is formed from a material adapted to resist oxidation and corrosion due to exposure to the molten electrolyte 22 in a cell 10. The anodes 112E may be ceramic-based, e.g., oxides of iron, titanium, zinc, cobalt, and copper, ferrites (nickel ferrites, copper ferrites, zinc ferrites, multi-element ferrites) and mixtures thereof; metallic-based, e.g., copper, nickel, iron, cobalt, titanium, aluminium, zinc, tin, and/or alloys of one of more of these metals; or cermet based (mixtures of oxides and metals, i.e., a composite material comprising at least one ceramic phase and one metallic phase). The cathodes 14E may be made from corrosion resistant, molten aluminium-wettable materials, such as titanium diboride, zirconium diboride, hafnium diboride, strontium diboride, carbonaceous materials and combinations thereof.

The opposed, vertically oriented electrodes 112E, 114E permit the gaseous phases ($O_2$), generated proximal thereto to detach therefrom and physically disassociate from the anode 112 due to the buoyancy of the $O_2$ gas bubbles in the molten salt electrolyte 22. Since the bubbles are free to escape from the surfaces of the anode 112 they do not build up on the anode surfaces to form an electrically insulative/resistive layer allowing the build-up of electrical potential, resulting in high resistance and, high energy consumption. The anodes 112E may be arranged in rows or columns with or without a side-to side clearance or gap between them to create a channel that enhances molten electrolyte movement, thereby improving mass transport and allowing dissolved alumina to reach the surfaces of the anode module 112. The number of rows of anodes 112E can vary from I to any selected number and the number of anodes 112E in a row can vary from I to any number. The cathodes 114E may be similarly arranged in rows with or without side-to-side clearance (gaps) between them and may similarly vary in the number of rows and the number of cathodes 114E in a row from I to any number.

Figure 4:
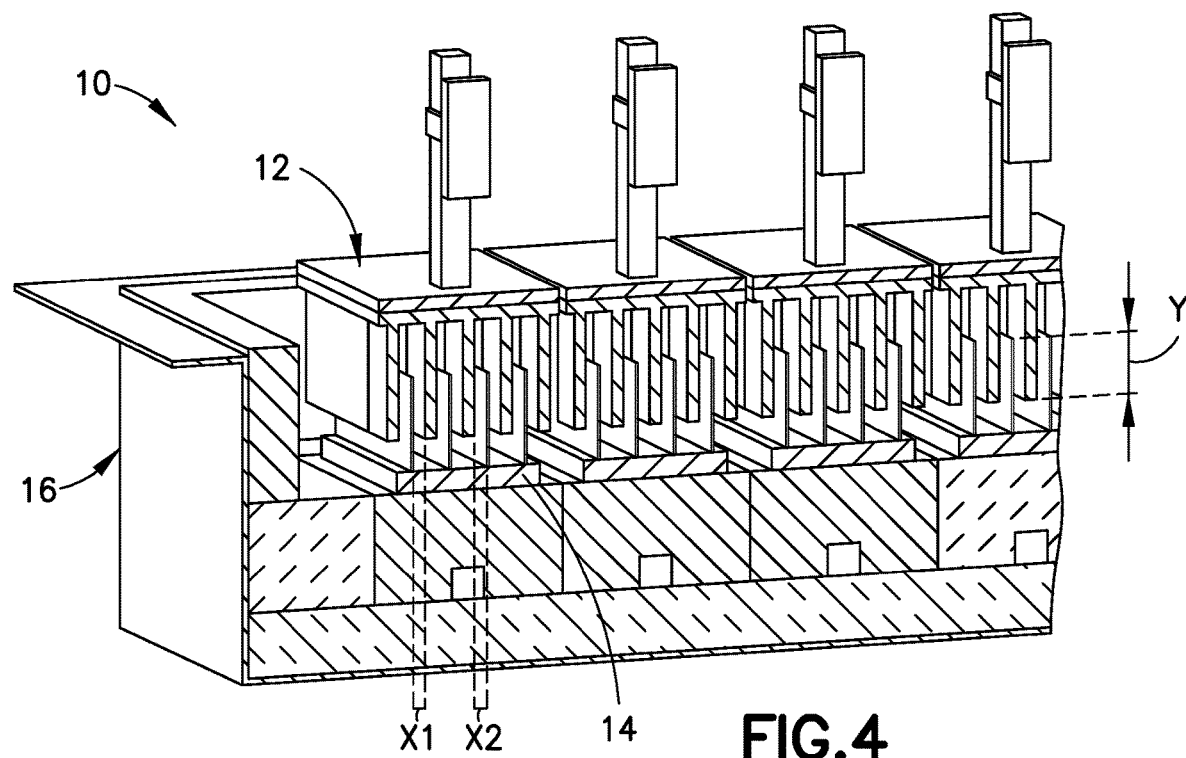
FIG. 4 is a partially cross-sectional, perspective view of an electrolytic cell in accordance with an embodiment of the present disclosure like FIG. 1, but with a cross-section taken perpendicular to that of FIG. 1.

FIG. 4 shows the cell IO of FIG. 1 in an orientation allowing the visualization of the ACD (XI, X2) and overlap Y.

Figure 5:
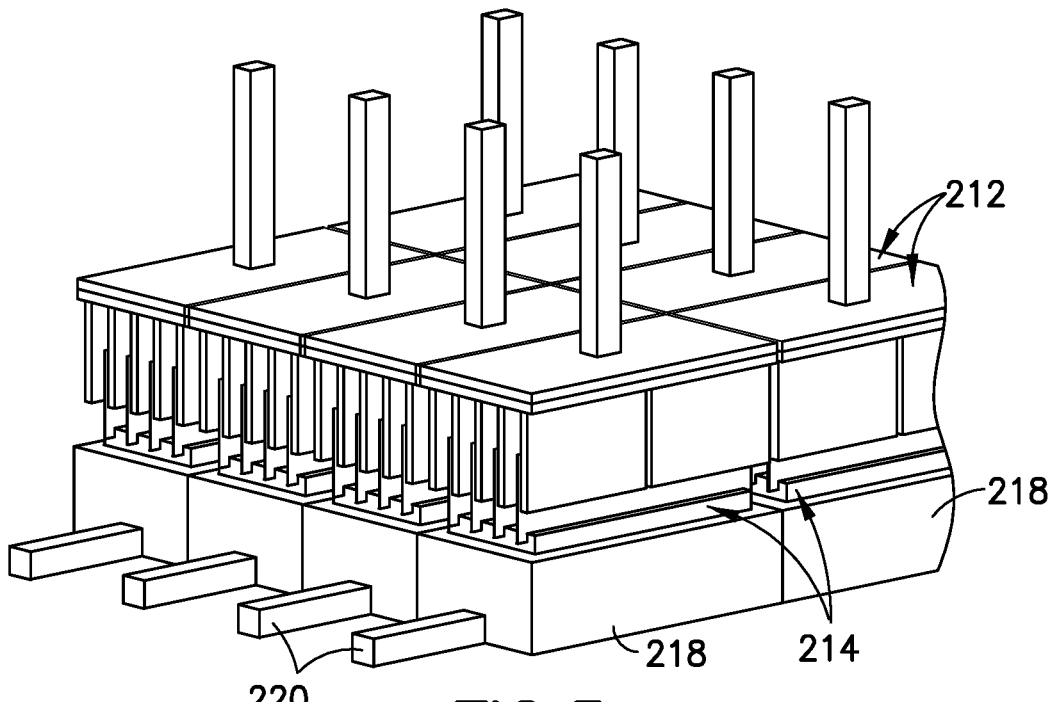
FIG. 5 is a perspective view of an array of interleaved anode and cathode modules in accordance with another embodiment of the present disclosure.

FIG. 5 shows two rows of an anode array of anode modules 212 and cathode modules 214 like those shown in FIGS. 1 and 2. For anode modules 212 and cathode modules 214 having the range of dimensions described above in reference to FIGS. 1 and 2, the number of anode modules 212 and cathode modules 214 in the array may be in the range of I to 64, in some embodiments 2 to 48 and in some embodiments 8 to 48 that would be accommodated in a reservoir 16 (FIG. 1).

Figure 6:
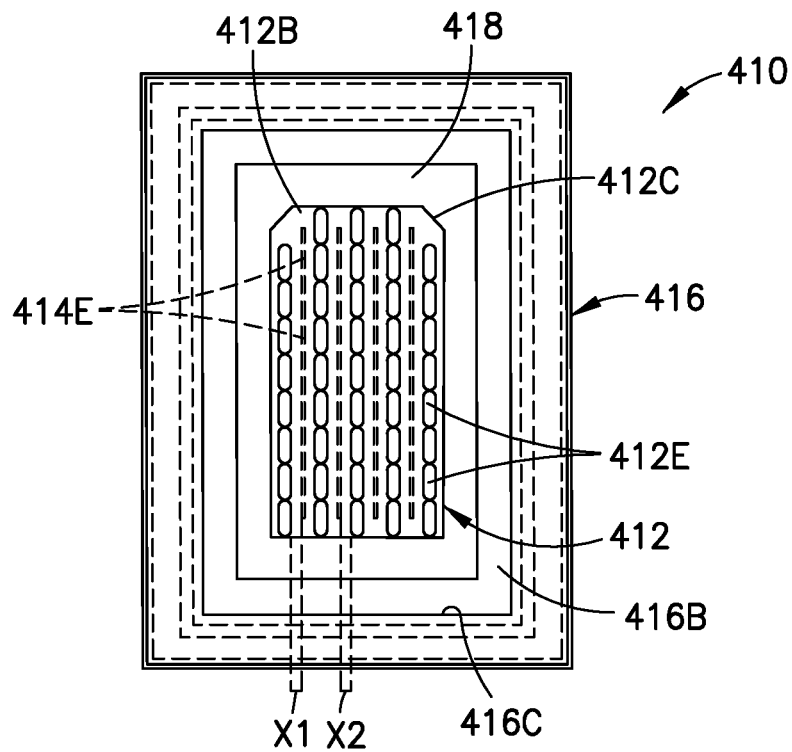
FIG. 6 is a partially phantom plan view of an anode-cathode module within an electrolytic cell in accordance with another embodiment of the present disclosure.

FIG. 6 shows an anode-cathode module 412 positioned within a cell 410 in accordance with another embodiment of the present disclosure. The anode module 412 has five rows of anodes 412E that are closely spaced or touching side-to-side on the longer dimension of the anode module 412. Three center rows of anodes have nine anodes 412E and two exterior rows have eight anodes 412E to accommodate chamfered edges 412C. The chamfered edges 412C may be used to allow adding alumina or aluminum metal tapping. Four rows of cathodes 414E, each four in number, are interleaved with the rows of anodes 412E.

The anode cathode distance (ACD) is both consistent and the same on either side of the anodes 412E and cathodes 414E, i.e., XI and X2 are approximately equal and may range in size, as described above in reference to FIG. 3. As noted above, the present disclosure contemplates that the ACD may be adjustable, such that XI and X2 are not equal. As noted above, the anode module 412 may be adjustable in height relative to the cathode module 414. The resultant overlap Y (See FIG. 3) may range from in size, as described above in reference to FIG. 3.

Figure 7:
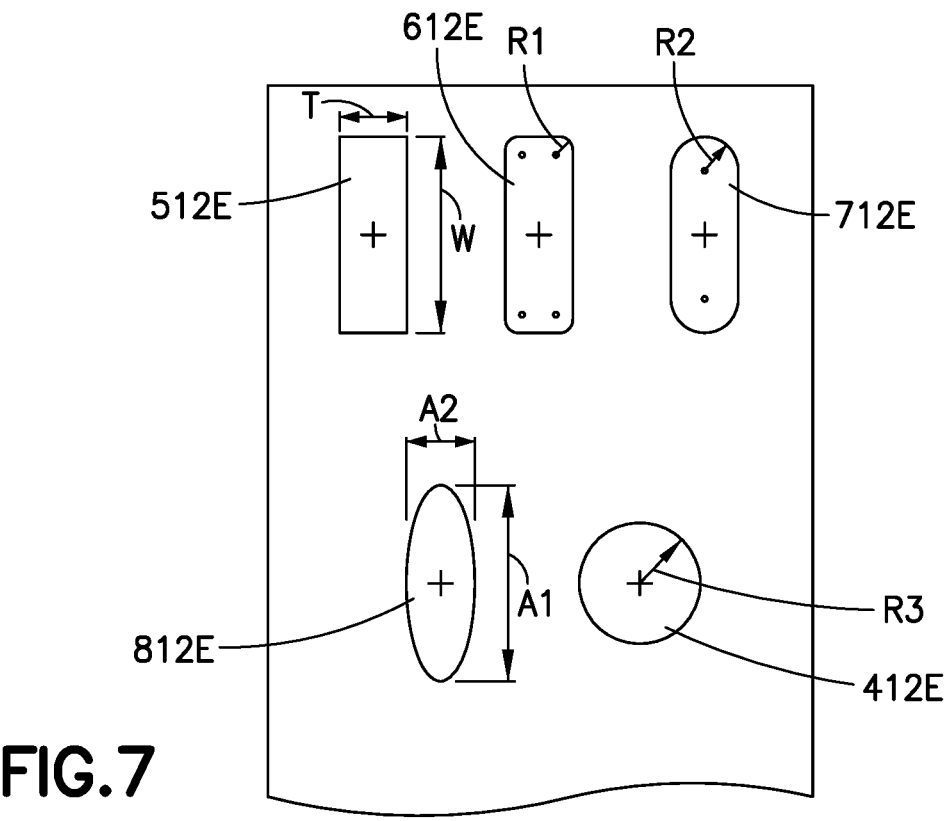
FIG. 7 is a series of diagrammatic cross-sectional views of a variety of anodes in accordance with embodiments of the present disclosure.

FIG. 7 shows a series of diagrammatic cross-sectional views of a variety of anodes 512E, 612E, 712E, 812E and 912E in accordance with embodiments of the present disclosure. Anode 512E has a rectangular cross-sectional shape and may have dimensions in the range of I" to 75" in width (W), 5" to 100" in height (into and out of the plane of the drawing) and ¼" to 10" in thickness (T). In some embodiments, the rectangular cross-sectional shape may have a width of 20" to 75", 40" to 75", 60" to 75", I" to 55", I" to 35", or I" to 15". In some embodiments, the rectangular cross-sectional shape may have a height of 5" to 80", 5" to 60", 5" to 40", 5" to 20", 20" to I00", 40" to I00", 60" to I00", or 80" to I00". In some embodiments, the rectangular cross-sectional shape may have a thickness of 1" to 10", 2" to 10", 4" to 10", 6" to 10", 8" to 10", 1" to 8", 1" to 6", 1" to 4", 1" to 2".

Anode 612E has a rectangular cross-sectional shape with radiused corners and may have dimensions in the range of 1" to 75" in width, 5" to 100" in height (into and out of the plane of the drawing), ¼" to 10" in thickness and radius of curvature R1 of ⅛" to 1". In some embodiments, the rectangular cross-sectional shape with radiused corners may have a width of 20" to 75", 40" to 75", 60" to 75", 1" to 55", 1" to 35", or 1" to 15". In some embodiments, the rectangular cross-sectional shape with radiused corners may have a height of 5" to 80", 5" to 60", 5" to 40", 5" to 20", 20" to 100", 40" to 100", 60" to 100", or 80" to 100". In some embodiments, the rectangular cross-sectional shape with radiused corners may have a thickness of 1" to 10", 2" to 10", 4" to 10", 6" to 10", 8" to 10", 1" to 8", 1" to 6", 1" to 4", 1" to 2". In some embodiments, the rectangular cross-sectional shape with radiused corners may have a radius of curvature R1 of ¼" to 1", ½" to 1", ⅛" to ½", or ⅛" to ¼".

Anode 712E has a rounded, rectangular cross-sectional shape with radiused ends and may have dimensions in the range of 1" to 50" in width, 5" to 75" in height (into and out of the plane of the drawing), ¼" to 6" in thickness and radius of curvature R2 of ⅛" to 3". In some embodiments, the rounded, rectangular cross-sectional shape with radiused ends may have a width of 10" to 50", 20" to 50", 30" to 50", 40" to 50", 1" to 40", 1" to 30", or 1" to 20", 1" to 10". In some embodiments, the rounded, rectangular cross-sectional shape with radiused ends may have a height of 5" to 60", 5" to 40", 5" to 20", 5" to 10", 20" to 75", 40" to 75", or 60" to 75". In some embodiments, the rounded, rectangular cross-sectional shape may have a thickness of 1" to 6", 2" to 6", 4" to 6", ¼" to 4", ¼" to 2", or ¼" to 1". In some embodiments, the rounded, rectangular cross-sectional shape with radiused ends may have a radius of curvature R2 of ⅛" to 3", ⅛" to 2", ⅛" to 1", 1" to 3", or 2" to 3".

Anode 812E has an elliptical cross-sectional shape with a major axis A1 in the range of 1" to 30", a minor axis A2 in the range of ¼" to 5" and a height in the range of 5" to 50". In some embodiments, the elliptical cross-sectional shape has a major axis A1 in the range of 1" to 20", 1" to 10", 1" to 5", 5" to 30", 10" to 30", or 20" to 30". In some embodiments, the elliptical cross-sectional shape has a minor axis A2 in the range of ¼" to 3", ¼" to 1", 1" to 5", or 3" to 5". In some embodiments, the elliptical cross-sectional shape has a height in the range of 5" to 40", 5" to 30", 5" to 20", 5" to 10", 10" to 40", 20" to 40", or 30" to 40".

Anode 912E has a circular cross-sectional shape with a radius R3 in the range of ¼" to 6" and a height in the range of 5" to 75". In some embodiments, the circular cross-sectional shape has a radius R3 in the range of 1" to 6", 3" to 6", 5" to 6", ¼" to 4", ¼" to 2", or ¼" to 1".

Figure 11:
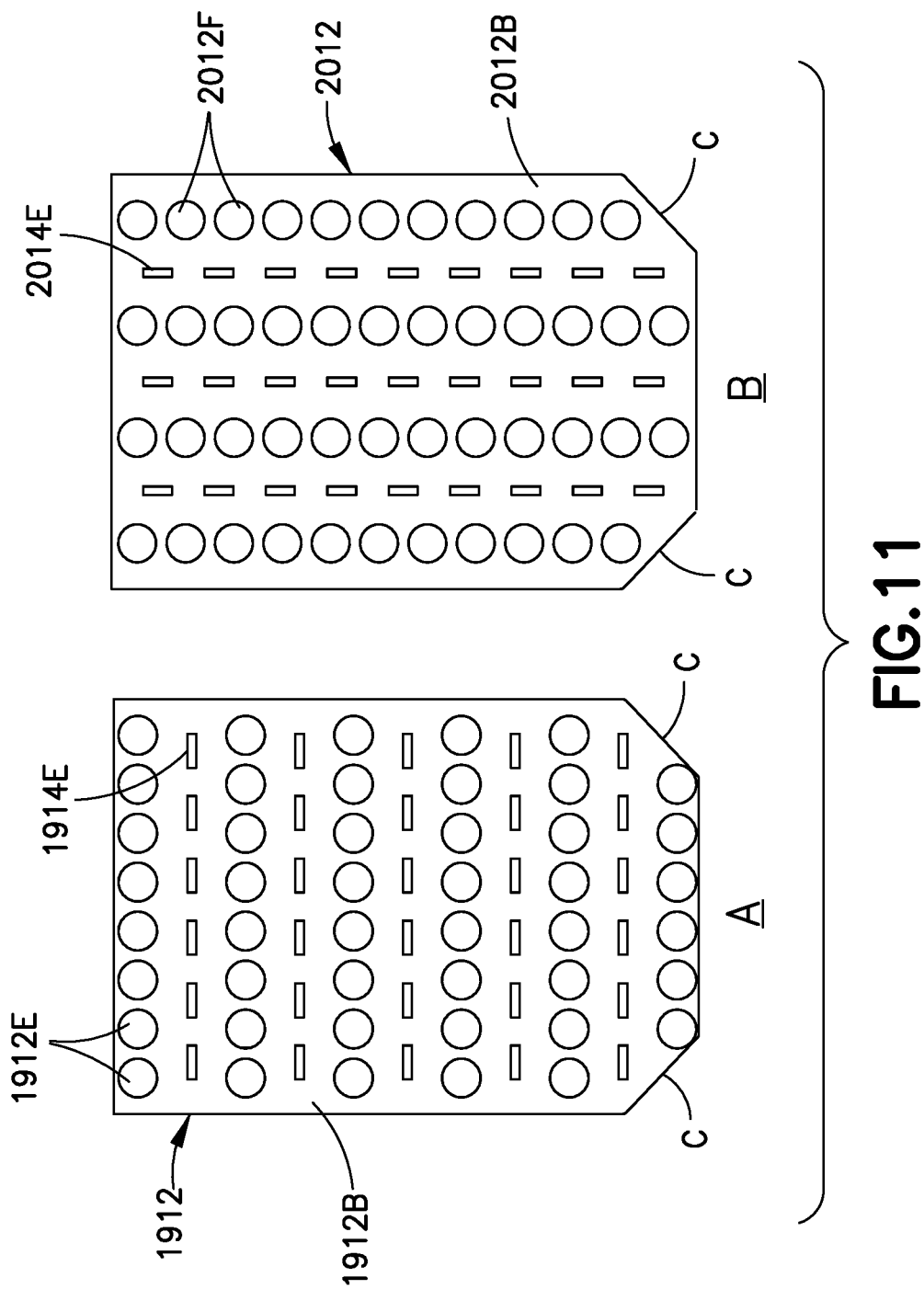

While each of the anode 512E-912E cross-sections shown in FIG. 11 may be consistent along the length of the respective anode 512E-912E, the cross-section may also vary along the length (height) of the anode, e.g., the anode may taper in any given direction, execute a periodic variance, or otherwise vary in thickness and/or width cross-section along the length (height) thereof.

Figure 8:
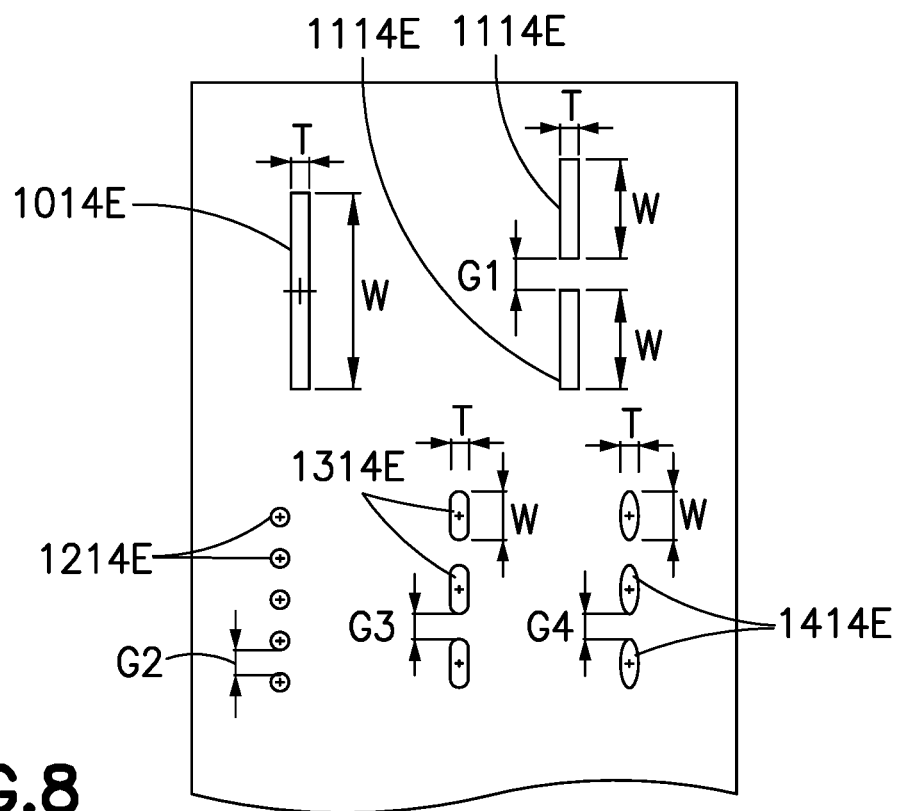
FIG. 8 is a series of diagrammatic cross-sectional views of a variety of cathodes in accordance with embodiments of the present disclosure.

FIG. 8 shows a series of diagrammatic cross-sectional views of a variety of cathodes 1014E, 1114E, 1214E, 1314E, and 1414E in accordance with embodiments of the present disclosure. Cathode 1014E has a rectangular cross-sectional shape and may have dimensions in the range of 1" to 75" in width (W), 5" to 100" in height (into and out of the plane of the drawing) and ⅛" to 5" in thickness (T). In some embodiments, the rectangular cross-sectional shape may have a width of 20" to 75", 40" to 75", 60" to 75", 1" to 55", 1" to 35", or 1" to 15". In some embodiments, the rectangular cross-sectional shape may have a height of 5" to 80", 5" to 60", 5" to 40", 5" to 20", 20" to 100", 40" to 100", 60" to 100", or 80" to 100". In some embodiments, the rectangular cross-sectional shape may have a thickness of 1" to 10", 2" to 10", 4" to 10", 6" to 10", 8" to 10", 1" to 8", 1" to 6", 1" to 4", 1" to 2".

Cathodes 1114E have a rectangular cross-sectional shape and may have dimensions in the range of 1" to 40" in width (W), 5" to 75" in height (into and out of the plane of the drawing) and ⅛" to 5" in thickness. They are spaced side-to-side by a gap G1 having dimensions in a range of ¹⁄₁₆" to 5". In some embodiments, the rectangular cross-sectional shape may have a width of 1" to 30", 1" to 20", 1" to 10", 10" to 40", 20" to 40", or 30" to 40". In some embodiments, the rectangular cross-sectional shape may have a height of 5" to 60", 5" to 40", 5" to 20", 20" to 75", 40" to 75", or 60" to 75". In some embodiments, the rectangular cross-sectional shape may have a thickness of 1" to 5", 3" to 5", ⅛" to 3", or ⅛" to 1". In some embodiments, the rectangular cross-sectional shape may have a gap G1 having dimensions in a range of 1" to 5", 3" to 5, ¹⁄₁₆" to 3", or ¹⁄₁₆" to 1".

Cathodes 1214E have a circular cross-sectional shape and may have dimensions in the range of ⅛" to 3" in radius and 5" to 75" in height (into and out of the plane of the drawing). They are spaced one from another by a gap G2 having dimensions in a range of ¹⁄₁₆" to 2". In some embodiments, the circular cross-sectional shape may have a radius of ⅛" to 2", ⅛" to 1", 1" to 3", or 2" to 3". In some embodiments, the circular cross-sectional shape may have a height of 20" to 75", 40" to 75", 60" to 75", 5" to 55", 5" to 35", or 5" to 15". In some embodiments, the circular cross-sectional shape may have a gap G2 having dimensions in a range of ⅛" to 2", ¼" to 2", 1" to 2", ¹⁄₁₆" to 1", ¹⁄₁₆" to ¼", or ¹⁄₁₆" to ⅛".

Cathodes 1314E have a rounded rectangular cross-sectional shape and may have dimensions in the range of ¼" to 3" in width (W), 5" to 75" in height (into and out of the plane of the drawing) and ⅛" to 3" in thickness. They are spaced one from another by a gap G3 having dimensions in a range of ¹⁄₁₆" to 3". In some embodiments, the rounded rectangular cross-sectional shape may have a width of ¼" to 2", ¼" to 1", ¼" to ½", ½" to 3", 1" to 3", or 2" to 3". In some embodiments, the rounded rectangular cross-sectional shape may have a height of 5" to 60", 5" to 40", 5" to 20", 20" to 75", 40" to 75", or 60" to 75". In some embodiments, the rounded rectangular cross-sectional shape may have a thickness of ⅛" to 3", ¼" to 3", 1" to 3", ⅛" to 2", ⅛" to 1", ⅛" to ½", or ⅛" to ¼". In some embodiments, the rounded rectangular cross-sectional shape may have a gap G3 having dimensions in a range of ¹⁄₁₆" to 2", ¹⁄₁₆" to 1", ¹⁄₁₆" to ½", ⅛" to 3", ¼" to 3", or 1" to 3".

Cathodes 1414E have an elliptical cross-sectional shape and may have dimensions with a major axis in the range of 1" to 8", a minor axis in the range of ¼" to 3" and a height in the range of 5" to 75". In some embodiments, the elliptical cross-sectional shape has a major axis in the range of 1" to 6", 1" to 4", 1" to 2", 2" to 8", 4" to 8", or 6" to 8". In some embodiments, the elliptical cross-sectional shape has a minor axis in the range of ¼" to 2", ¼" to 1", ½" to 3", or 1" to 3". In some embodiments, the elliptical cross-sectional shape has a height in the range of 5" to 60", 5" to 40", 5" to 20", 5" to 10", 20" to 75", 40" to 75", or 60" to 75".

Figure 9:
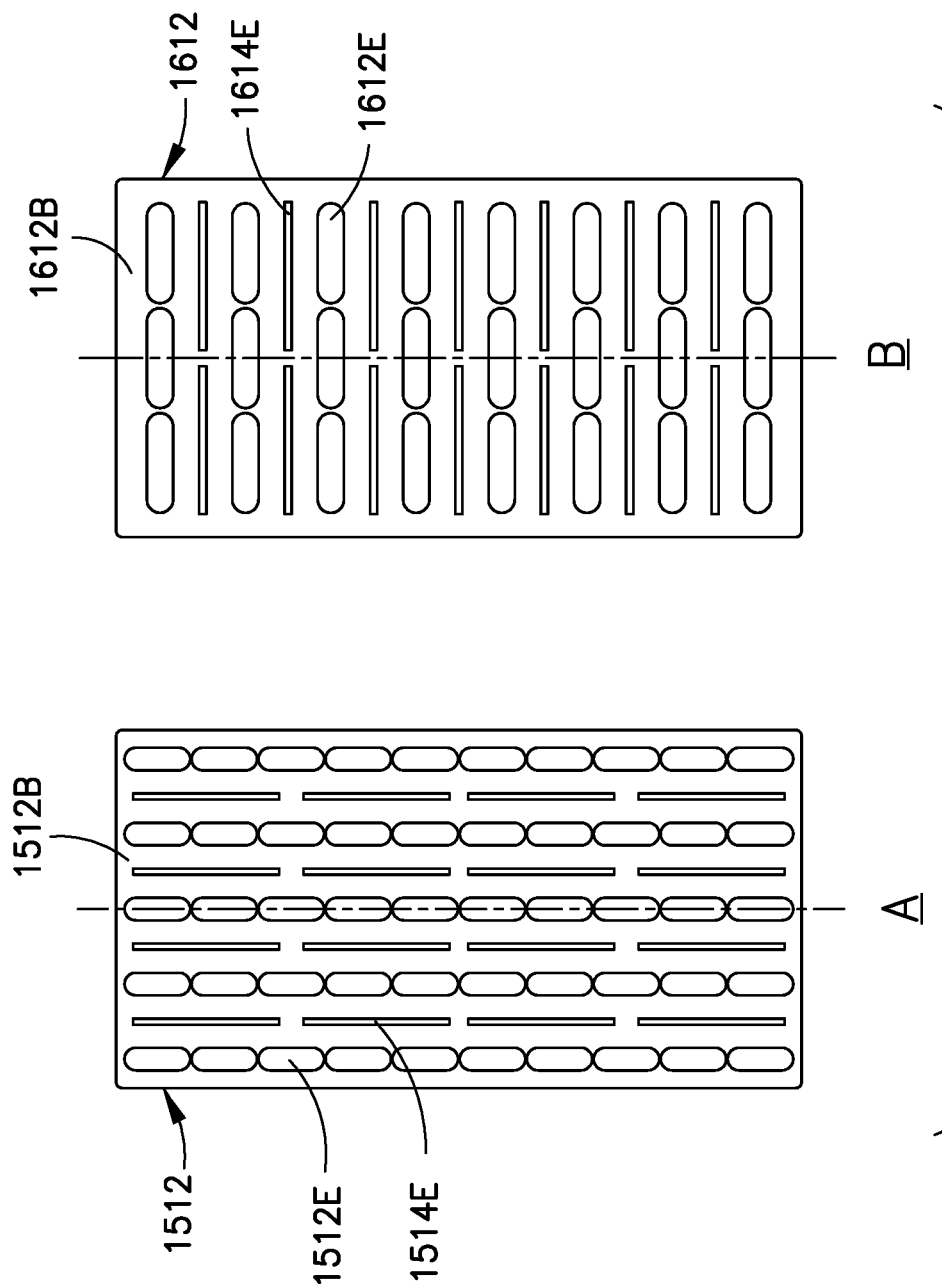
FIGS. 9-13 are a series of diagrammatic plan views of a variety of interleaved anode and cathodes, in accordance with embodiments of the present disclosure.

FIGS. 9-13 show diagrammatic views of a variety of interleaved anode and cathodes, in accordance with embodiments of the present disclosure. FIGS. 9-13 show that the rows of anodes 1512E . . . 2412E and the rows of cathodes 1514E . . . 2414E (and the channels there between that are defined thereby) may be arranged in rows that may have a selected orientation relative to a given cell 10. FIG. 9 shows two anode/cathode configurations A and B, each featuring elongated rectangular thermal insulation layers 1512B, 1612B. Anode module 1512 has five rows of anodes 1512E, ten in number, that are closely spaced or touching side-to-side along the longer dimension of the anode module 1512. Four rows of cathodes 1514E, each four in number, are interleaved with the rows of anodes 1512E. Anode module 1612 has eight rows of anodes 1612E, three in number per row, that are closely spaced or touching side-to-side along the shorter dimension of the anode module 1612. Seven rows of cathodes 1614E, each two in number, are interleaved with the rows of anodes 1612E.

Figure 10:
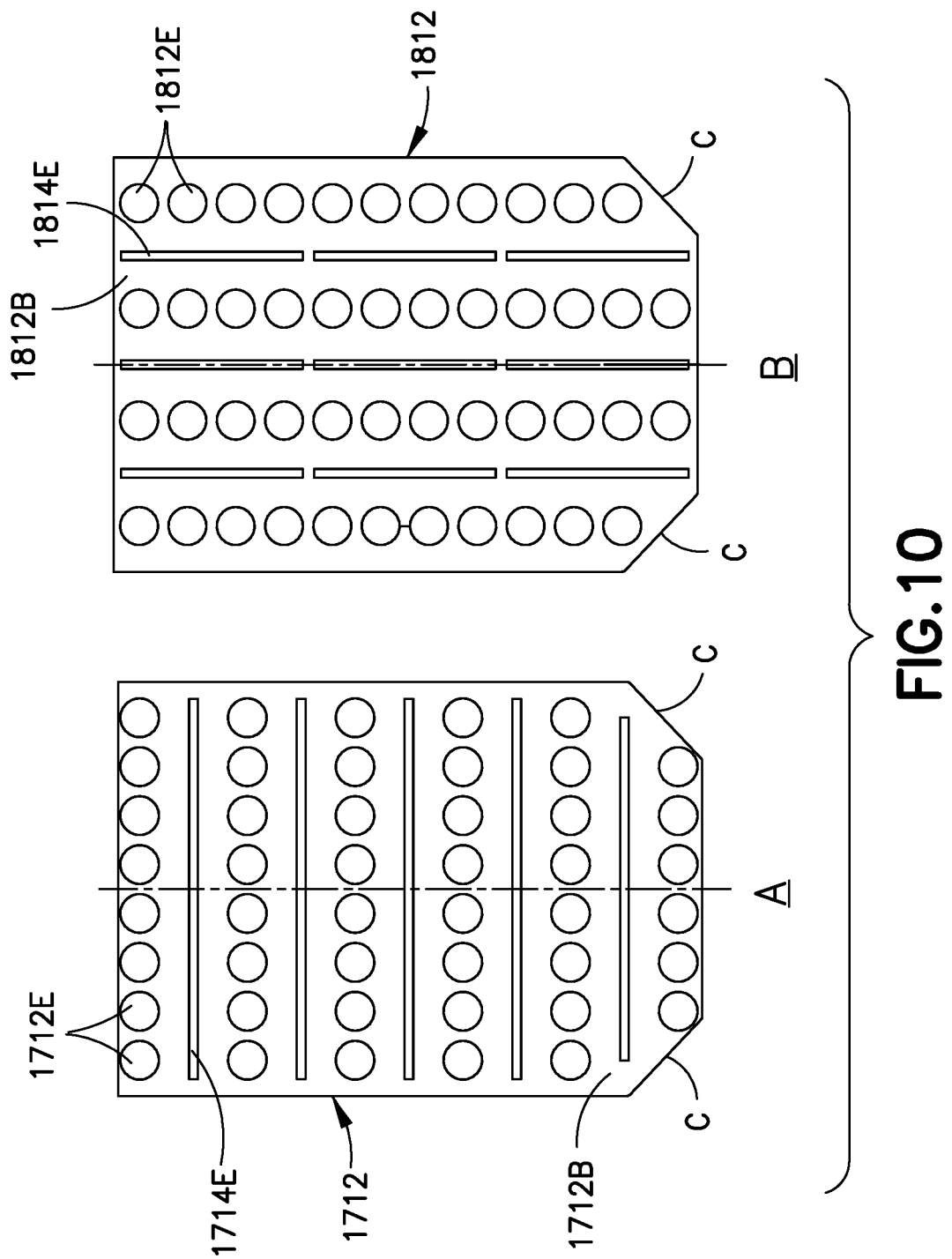

FIG. 10 shows two anode cathode configurations A and B, each featuring rectangular thermal insulation layers 1712B, 1812B with chamfers C. Anode module 1712 has six rows of anodes 1712E with circular cross-sectional shape. Each row, which extends across the smaller dimension of the anode module 1712, has eight anodes 1712E, except the row near the chamfers C, which has six. The anodes 1712E are spaced along the shorter dimension of the anode module 1712. Five rows of cathodes 1714E with a generally rectangular cross-sectional shape, each row having four cathodes 1714E, are interleaved with the rows of anodes 1712E. Anode module 1812 has four rows of anodes 1812E having circular cross-sectional shape, each with either twelve (center rows) or eleven anodes (end rows near chamfer) per row, that are closely spaced along the longer dimension of the anode module 1812. Three rows of cathodes 1814E, each with three cathodes 1814E in number, are interleaved with the rows of anodes 1812E.

FIG. 11 shows two anode-cathode configurations A and B, each featuring rectangular thermal insulation layers 1912B, 2012B with chamfers C. Anode module 1912 has six rows of anodes 1912E with circular cross-sectional shape. Each row, which extends across the smaller dimension of the anode module 1912, has eight anodes 1912E, except the row near the chamfers C, which has six. The anodes 1912E are spaced along the shorter dimension of the anode module 1912. Five rows of cathodes 1914E with a generally rectangular cross-sectional shape, each row having six cathodes 1914E, are interleaved with the rows of anodes 1912E. Anode module 2012 has four rows of anodes 2012E with a circular cross-sectional shape, each with either twelve (center rows) or eleven anodes (end rows near chamfer) per row, that are closely spaced along the longer dimension of the anode module 2012. Three rows of cathodes 2014E, each with nine cathodes 2014E in number, are interleaved with the rows of anodes 2012E.

Figure 12:
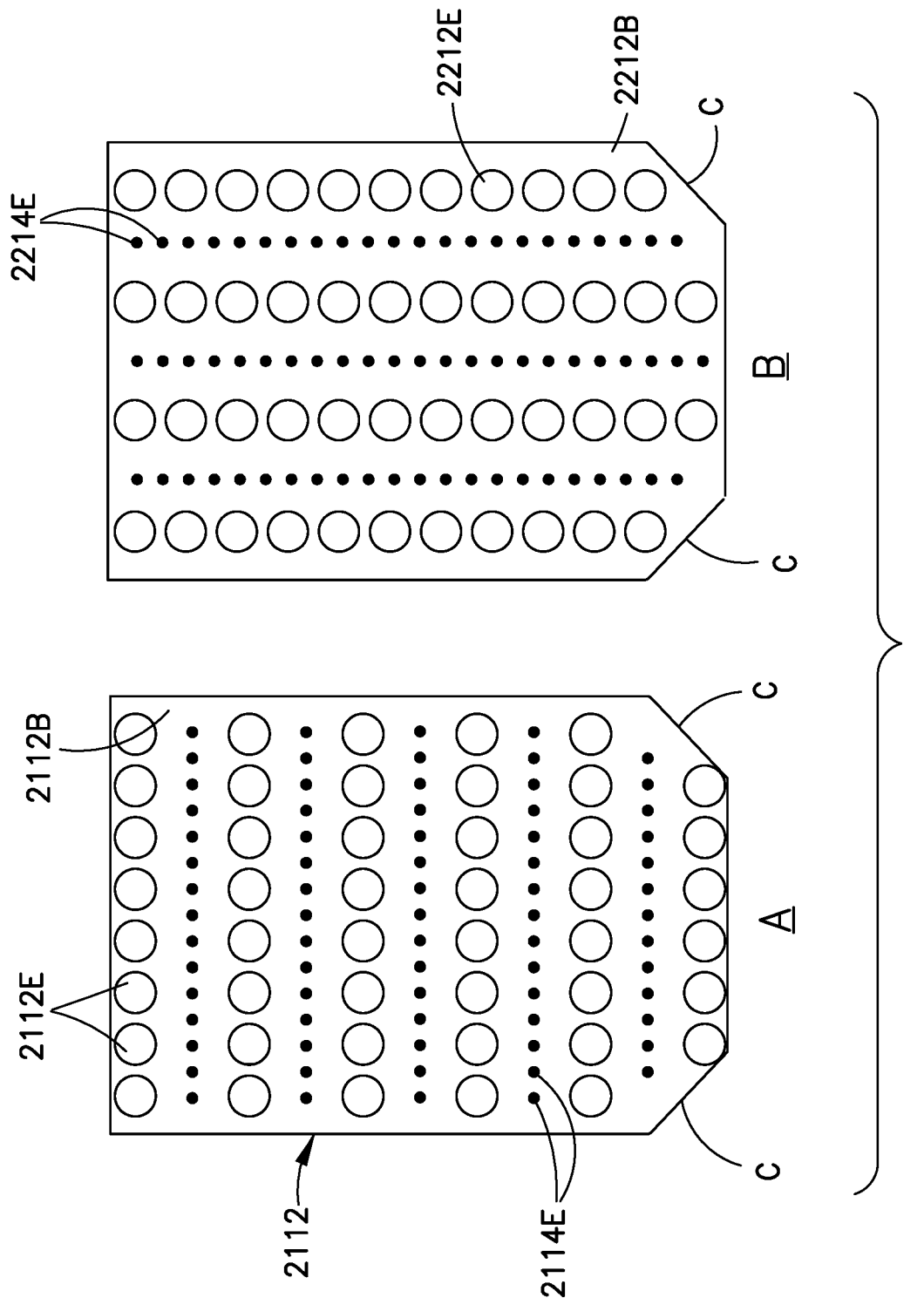

FIG. 12 shows two anode-cathode configurations A and B, each featuring rectangular thermal insulation layers 2112B, 2212B with chamfers C. Anode module 2112 has six rows of anodes 2112E with circular cross-sectional shape. Each row, which extends across the smaller dimension of the anode module 2112, has eight anodes 2112E, except the row near the chamfers C, which has six. The anodes 2112E are spaced along the shorter dimension of the anode module 2112. Five rows of cathodes 2114E with a generally circular cross-sectional shape, each row having fifteen cathodes 2114E, except for the row nearest the chamfers, which has thirteen, are interleaved with the rows of anodes 2112E. Anode module 2212 has four rows of anodes 2212E with a circular cross-sectional shape, each with either twelve (center rows) or eleven anodes (end rows near chamfer) per row, that are closely spaced along the longer dimension of the anode module 2212. Three rows of cathodes 2214E having a circular cross-sectional shape, each with either twenty-three cathodes (center row) or twenty-two (end rows) in number, are interleaved with the rows of anodes 2212E.

Figure 13:
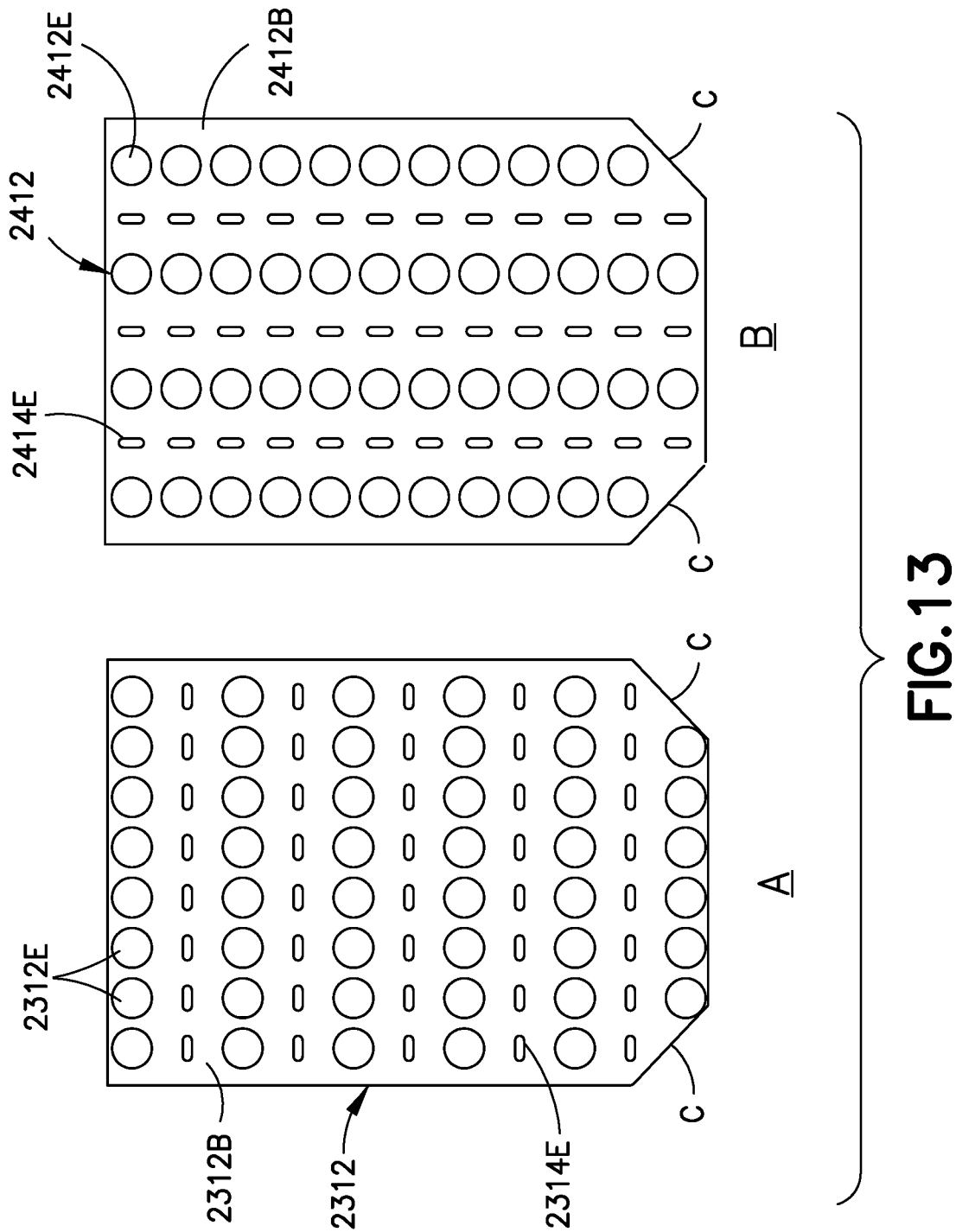

FIG. 13 shows two anode-cathode configurations A and B, each featuring rectangular thermal insulation layers 2312B, 2412B with chamfers C. Anode module 2312 has six rows of anodes 2312E with circular cross-sectional shape. Each row, which extends across the smaller dimension of the anode module 2312, has eight anodes 2312E, except the row near the chamfers C, which has six. The anodes 2312E are spaced in rows along the shorter dimension of the anode module 2312. Five rows of cathodes 2114E with a generally rectangular cross-sectional shape with radiused-ends, each row having eight cathodes 2314E are interleaved with the rows of anodes 2312E. Anode module 2412 has four rows of anodes 2412E with a circular cross-sectional shape, each with either twelve (center rows) or eleven anodes (end rows near chamfer) per row, that are closely spaced along the longer dimension of the anode module 2412. Three rows of cathodes 2414E with a rectangular cross-sectional shape with radiused ends, each with twelve cathodes, are interleaved with the rows of anodes 2412E.

The above-described electrodes in the dimensional ranges disclosed may be used to produce Pl020 or better aluminum metal. The increased surface area of the electrodes per unit of cell volume may lead to higher rates of production. The above described electrode structures may elimination or reduction of $CO_2$ generation and reduce pollutants generated by Hall-Heroult smelting, such as $CF_4$ and $SO_2$.

In some embodiments, a method for producing aluminum metal by the electrochemical reduction of alumina, comprises: (a) passing current between an anode and a cathode through an electrolytic bath of an electrolytic cell, the cell comprising: (i) at least one anode module having a plurality of anodes, wherein each of the plurality of anodes is an oxygen-involving anode, (ii) at least one cathode module, opposing the anode module, wherein the at least one cathode module comprises a plurality of cathodes, wherein each of the plurality of anodes and each of the plurality of cathodes have surfaces thereon that are vertically oriented and spaced one from another, wherein the cathodes are wettable, and wherein the at least one cathode module is coupled to a bottom of the electrolytic cell, (iii) a cell reservoir, (iv) an electrolyte disposed within the cell reservoir, and (v) a metal pad disposed within the cell reservoir, wherein the plurality of anodes are at least partially immersed in the electrolyte and suspended above the cathode module and extending downwards towards the cathode module, wherein the plurality of cathodes are completely immersed in the electrolyte, wherein the plurality of cathodes are positioned in the cell reservoir extending upwards towards the anode module, wherein each of the plurality of anodes and each of the plurality of cathodes are alternatingly positioned within the cell reservoir, wherein the plurality of anodes is selectively positionable in a horizontal direction relative to adjacent cathodes, wherein the anode module is selectively positionable in a vertical direction relative to the cathode module, and wherein a portion of each of the anode electrodes overlap a portion of adjacent cathodes; (b) feeding a feed material into the electrolytic cell; and (c) adjusting the anode module in a vertical direction relative to the cathode module.

In some embodiments of the above described method, the feed material is electrolytically reduced into a metal product. In some embodiments of the above described method, the metal product is drained from the cathodes to the cell bottom to form a metal pad. In some embodiments of the above described method, a metal product is produced having a purity of P1020. In some embodiments of the above described method, adjusting the anode module comprises raising the at least one anode module to decrease an overlap of the portion of each of the anode electrodes relative to the portion of adjacent cathodes (e.g. decrease the anode-cathode overlap (ACO)). In some embodiments of the above described method, adjusting the anode module comprises lowering the at least one anode module to increase an overlap of the portion of each of the anode electrodes relative to the portion of adjacent cathodes. (e.g. increase the anode-cathode overlap (ACO)).

In some embodiments, a method for producing aluminum metal by the electrochemical reduction of alumina, comprises: (a) passing current between an anode and a cathode through an electrolytic bath of an electrolytic cell, the cell comprising: (i) at least one anode module having a plurality of anodes, wherein each of the plurality of anodes is an oxygen-involving anode, (ii) at least one cathode module, opposing the anode module, wherein the at least one cathode module comprises a plurality of cathodes, wherein each of the plurality of anodes and each of the plurality of cathodes have surfaces thereon that are vertically oriented and spaced one from another, wherein the cathodes are wettable, and wherein the at least one cathode module is coupled to a bottom of the electrolytic cell, (iii) a cell reservoir, (iv) an electrolyte disposed within the cell reservoir, and (v) a metal pad disposed within the cell reservoir, wherein the plurality of anodes are at least partially immersed in the electrolyte and suspended above the cathode module and extending downwards towards the cathode module, wherein the plurality of cathodes are completely immersed in the electrolyte, wherein the plurality of cathodes are positioned in the cell reservoir extending upwards towards the anode module, wherein each of the plurality of anodes and each of the plurality of cathodes are alternatingly positioned within the cell reservoir, wherein the plurality of anodes is selectively positionable in a horizontal direction relative to adjacent cathodes, wherein the anode module is selectively positionable in a vertical direction relative to the cathode module, and wherein a portion of each of the anode electrodes overlap a portion of adjacent cathodes; (b) feeding a feed material into the electrolytic cell; and (c) adjusting the plurality of anodes in a horizontal direction relative to adjacent cathodes.

In some embodiments of the above described method, the plurality of anodes is adjusted in a horizontal direction such that a horizontal spacing (e.g. the anode-cathode distance (ACD)) is the same, or substantially similar, on either side of the anodes in the anode module (i.e. when measuring the ACD on either side of an anode in the anode module to cathodes positioned on opposite sides of the anode). In some embodiments of the above described method, the feed material is electrolytically reduced into a metal product.

In some embodiments of the above described method, the metal product is drained from the cathodes to the cell bottom to form a metal pad. In some embodiments of the above described method, a metal product is produced having a purity of P1020.

The adjustment of the vertical or horizontal position of the anode module as described in embodiments above provides for increased electrical efficiency in electrolytic metal production. The adjustment of the vertical or horizontal position of the anode module as described in embodiments above also provides for reduced cell voltage drop (e.g. reduced electrical resistance). The adjustment of the vertical or horizontal position of the anode module as described in embodiments above also provides for modified cell temperature; modified feed rate of feed material, and or optimized cell operating parameters.

It will be understood that the embodiments described herein are merely exemplary and that a person skilled in the art may make many variations and modifications without departing from the spirit and scope of the disclosed subject matter. All such variations and modifications are intended to be included within the scope of the disclosure.

What is claimed is:

1. An electrolytic cell for producing aluminum metal, the electrolytic cell comprising at least one anode module having a plurality of anodes and being supported above a corresponding at least one cathode module having a plurality of cathodes, the at least one anode module being supported by a positioning apparatus configured to move inside the cell for selectively positioning the plurality of anodes within the electrolytic cell relative to adjacent cathodes in order to adjust an anode-cathode distance (ACD) and/or an anode-cathode overlap (ACO), wherein:

the electrolytic cell further comprises an adjustment system coupled to the at least one cathode module for moving said at least one cathode module and adjusting said anode-cathode distance (ACD).

2. The electrolytic cell according to claim 1, wherein the positioning apparatus comprises a connector assembly for connecting the at least one anode module to a span beam located above the at least one anode module, the connector assembly being configured to move freely along a length of the span beam to allow for selective positioning of the plurality of anodes in a horizontal direction relative to adjacent cathodes in order to adjust said anode-cathode distance (ACD).

3. The electrolytic cell according to claim 2, wherein the span beam has a first end and an opposing second end, the span beam being supported by a first supporting apparatus at the first end and by a second supporting apparatus at the second end, each of the supporting apparatuses being positioned on a deck adjacent of a sidewall of the electrolytic cell.

4. The electrolytic cell according to claim 3, wherein the span beam is oriented perpendicular to the sidewall.

5. The electrolytic cell according to claim 3, wherein the supporting apparatuses are coupled to the deck.

6. The electrolytic cell according to claim 3, wherein the span beam is configured to be raised or lowered by lifts coupled to the supporting apparatuses.

7. The electrolytic cell according to claim 6, wherein the connector assembly comprises a first portion in contact with and connected to an upper surface of the anode module.

8. The electrolytic cell according to claim 7, wherein the first portion is connected to the upper surface at a plurality of connection points.

9. The electrolytic cell according to claim 7, wherein the connector assembly further comprises a second portion comprising a first end and an opposing second end, the first end of the second portion being coupled to, or integrally formed with, the first portion, the second portion extending vertically from the first portion toward the span beam.

10. The electrolytic cell according to claim 9, wherein the connector assembly further comprises a third portion coupled to the second end of the second portion, the third portion being configured to slide along the length of the span beam.

11. The electrolytic cell according to claim 10, wherein the third portion is configured to be clamped to the span beam in order to fix a position of the positioning module on the span beam, or unclamped when the third portion is moved freely along the length of the span beam to change the portion of the positioning module on the span beam.

12. The electrolytic cell according to claim 2, wherein in accordance with a number of anode modules and cathode modules in the electrolytic cell, the cell comprises more than one of said span beam in parallel configuration, each span beam supporting one or more anode module along the length of each span beam, each anode module comprising one of said positioning apparatus.

13. The electrolytic cell according to claim 1, wherein the positioning apparatus is connected to at least one bridge oriented perpendicular to endwalls and parallel to sidewalls of said electrolytic cell, the positioning apparatus being configured to raise or lower to the anode module in a vertical direction relative to the cathode module in order to adjust said anode-cathode overlap (ACO).

14. The electrolytic cell according to claim 13, wherein the at least one bridge comprising a first end and an opposing second end, the bridge being supported by a supporting apparatus at the first end and at the second end.

15. The electrolytic cell according to claim 14, wherein the supporting apparatus comprises a plurality of vertical supports positioned on opposing decks of each endwall.

16. The electrolytic cell according to claim 15, wherein each vertical support is coupled to each corresponding deck.

17. The electrolytic cell according to claim 15, wherein during operation of the electrolytic cell for the production of aluminum, the cell is heated to a temperature sufficient to result in expansion of the cell, the vertical supports at one deck are unlocked for free floating, thereby allowing the deck of the cell to expand without deforming any portion of the cell.

18. The electrolytic cell according to claim 13, wherein the anode module is coupled to the bridge via a connector apparatus comprising a first portion in contact with and connected to an upper surface of the anode module.

19. The electrolytic cell according to claim 18, wherein the first portion is connected to the upper surface at a plurality of connection points.

20. The electrolytic cell according to claim 18, wherein the connector apparatus further comprises a second portion having a first end and an opposing second end, the first end of the second portion being coupled to, or integrally formed with, the first portion.

21. The electrolytic cell according to claim 20, wherein the second portion extends vertically from the first portion toward the bridge, the connector apparatus further comprises a third portion coupled to the opposite second end of the second portion, the third portion being configured to raise or lower the anode module in the vertical direction relative to the cathode module in order to adjust the anode-cathode overlap (ACO).

22. The electrolytic cell according to claim 18, wherein the connector apparatus is further configured to move along a length of the bridge to allow for selective positioning of the plurality of anodes in a horizontal direction relative to adjacent cathodes.

23. The electrolytic cell according to claim 1, wherein the plurality of anodes are inert anodes.

\* \* \* \* \*